(12) United States Patent
Sanderlin et al.

(10) Patent No.: US 7,044,619 B2
(45) Date of Patent: May 16, 2006

(54) REMOTE CONTROL TOWER DEVICE AND SYSTEM

(76) Inventors: Jerry D. Sanderlin, 2440 Montego Dr., Miramar, FL (US) 33023; Robert Garcia, 1341 Beckenham Dr., Baton Rouge, LA (US) 70808

( * ) Notice: Subject to any disclaimer, the term of this patent is extended or adjusted under 35 U.S.C. 154(b) by 0 days.

(21) Appl. No.: 10/797,942

(22) Filed: Mar. 11, 2004

(65) Prior Publication Data
US 2004/0262464 A1 Dec. 30, 2004

Related U.S. Application Data

(60) Provisional application No. 60/453,486, filed on Mar. 11, 2003.

(51) Int. Cl.
*F21V 33/00* (2006.01)
*F16M 11/00* (2006.01)
(52) U.S. Cl. .............. 362/253; 362/233; 362/413; 362/269; 248/127
(58) Field of Classification Search ............. 362/233, 362/253, 190, 198, 413, 418, 269; 211/26.1; 248/127, 130, 160
See application file for complete search history.

(56) References Cited

U.S. PATENT DOCUMENTS

| 4,017,152 A | * | 4/1977 | Allen | 359/443 |
| D327,998 S | | 7/1992 | Williams | |
| 5,244,173 A | | 9/1993 | Kulyk | |
| 5,316,249 A | | 5/1994 | Anderson | |
| 5,337,904 A | | 8/1994 | Goldberg | |
| 5,370,241 A | | 12/1994 | Silvers | |
| 5,419,263 A | | 5/1995 | Mills | |
| 5,419,613 A | * | 5/1995 | Wedeking | 297/217.1 |
| 5,475,382 A | | 12/1995 | Yuen | |
| 5,601,194 A | | 2/1997 | Brinston | |
| D391,098 S | | 2/1998 | Northrop | |
| 5,739,447 A | * | 4/1998 | Hoshino | 84/402 |
| 6,053,461 A | | 4/2000 | Goss | |
| D423,821 S | | 5/2000 | Crump | |
| D426,985 S | | 6/2000 | Casalino | |
| 6,238,061 B1 | * | 5/2001 | McKenzie et al. | 362/253 |

* cited by examiner

*Primary Examiner*—Ali Alavi
(74) *Attorney, Agent, or Firm*—David P. Lhota; Stearns Weaver Miller Weissler Alhadeff & Sitterson, P.A.

(57) ABSTRACT

A remote control support tower having a support frame secured to a rotatable platform or adjustable height stand and an optical wave guide system wherein the optical wave guide system comprises at least one optical wave guide that receives remote control signals along one path and redirects or retransmits the signals along a second path in the direction of electronic equipment being controlled. The remote control support tower may also include a lamp fixture. In an alternative embodiment, the remote control tower includes a height adjustable stand, a bracket rotatably connected to the stand, a remote control holder unit rotatably mounted to the bracket and remote control clamp/clip for mounting the remote control to the holder.

14 Claims, 8 Drawing Sheets

REMOTE CONTROL TOWER DEVICE AND SYSTEM

CROSS REFERENCE TO RELATED APPLICATIONS

This application claims the benefit of provisional patent application Ser. No. 60/453,486 filed Mar. 11, 2003.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyrights rights whatsoever.

BACKGROUND OF THE INVENTION

1. Field of the Invention

This invention relates generally to remote controls, and more particularly, to a remote control support device or tower that holds remote controls in a central location and facilitates directional control of the remote controls such that they do not have to be removed for use, thus alleviating the risk of misplacement. Directional control is achieved with a stand having at least one remote control support that has at least two degrees of freedom for vertically and horizontally adjusting the direction of signal transmission or reflective surfaces that at least horizontally and vertically control the direction of signal transmission.

2. Description of the Background Art

Remote controls for remotely controlling electronic entertainment devices, such as televisions, cable boxes and stereos, are well known. In fact, the typical home has several different remote controls for operating various electronic devices. However, since remote controls are portable they are easily lost or misplaced such that they are not conveniently available for use. In addition, remote controls can be awkward to handle at certain times, such as when holding a telephone or child. If a device or system existed that supported remote controls in a central location while facilitating directional control, it would enhance the convenient use of remote controls and help prevent one from losing or misplacing remote controls. The instant invention addresses this need in the prior art.

Although various remote control stands are known in the prior art, they fail to adequately address and solve the above noted problems with remote controls. For instance, U.S. Pat. No. 5,244,173 discloses a holder for remote control units having a body with a bottom configured to rest on a horizontal plane in use. U.S. Pat. No. 5,316,249 discloses a stand for holding an electronic remote control unit that has a horizontal bottom surface, a contiguous vertical end surface extending upwardly from one end of the bottom surface, and a contiguous rectangular top surface extending outwardly from the upper end of the vertical surface spaced directly above the horizontal bottom surface for releasably supporting an electronic remote control unit thereon and an extendible coiled tether cord that is secured at one end to the stand and at the other end to the remote control unit whereby the remote control unit may be removed from a position supported on the stand but is prevented from complete separation from the stand. U.S. Pat. No. 5,337,904 discloses a storage and display rack which has a base plate, a spreader plate thereabove, and a holder at the top which is provided with devices to engage electronic remote controls and the like to permit storage, display and ready removability of remote control devices for accessibility and use. U.S. Pat. No. 5,370,241 discloses a holder for remote controls that houses at least two remote controls and has at least two shelves, one shelf for each remote control, and folding shelves that connect to a vertical support member with a pivotal fastening means, which permits the user to raise the upper shelves to gain access to remote controls on the lower shelves. U.S. Pat. No. 5,419,263 discloses a table adapted to hold a TV remote control or other similar control mechanism, wherein the table includes a plate having a top surface and a bottom surface, a pile type fastener for coupling a remote control to the top surface, a pedestal having a base extended in a horizontal plane, and a rod having a lower end and upper support end. The upper support end of the rod includes a mechanism for pivotally coupling the pedestal to the bottom surface of the plate, enabling the orientation of the plate relative to the pedestal to be modified such that a remote control coupled to the top surface may be aimed at a desired location without removing it from the plate. U.S. Pat. No. 5,475,382, issued to Yuen, discloses a mounting stand for a remote control unit that aligns the remote control unit with a device to be controlled. U.S. Pat. No. 5,601,194, issued to Brinston, describes a remote control stand for storing and organizing remote control units for consumer-type electronic devices including an outer housing having a base portion and an interior chamber having an access opening in connection therewith located at the top of the housing; and first and second resilient members adjacently disposed within the interior chamber in a manner such that a portion of a remote control may be placed between the adjacent surfaces of the first and second resilient members through the access opening. U.S. Pat. No. 6,053,461, issued to Goss, describes a remote control stand for supporting a remote control above a floor surface so that the remote control is easily retrievable by a user.

Although various remote control stands are disclosed in the prior art, they fail to adequately address the issues as contemplated by the instant invention. The instant invention fills this gap in the prior art by providing a remote control support device and system that secures remote controls in a manner that facilitates directional control of the remote

BRIEF SUMMARY OF THE INVENTION

In light of the foregoing, it is an object of the present invention to provide a remote control support device that secures remote controls to prevent misplacement while facilitating full use of the remote controls.

It is also object of the present invention to provide a remote control support device and system that supports remote controls in a single location.

It is another object of the instant invention to provide a remote control support device and system that facilitates directional control of remote control signals.

It is a further object of the instant invention to provide a remote control support device and system that can support a plurality of remote controls.

In light of these and other objects, the instant invention generally comprises a holder for supporting at least one and preferably a plurality of remote controls that are used for operating electronic equipment such as televisions, VCRs, DVD players and stereo receivers. The holder preferably comprises an adjustable remote control tower that secures remote controls and adjustably directs infrared signals from the remote control units. The remote control tower allows the user to control multiple pieces of home entertainment equipment from one location without having to locate or move the remote control unit or units, thereby preventing the misplacement of the remote control unit or units.

The remote control support device and system of the instant invention, generally referenced herein as a remote control tower, secures at least one remote control and preferably a plurality of remote controls in a manner that facilitates directional control of the remote control signals. In the preferred embodiment, the remote control tower comprises a support frame secured to a rotatable platform or adjustable height stand and an optical wave guide system. The optical wave guide system preferably comprises a plurality of optical wave guides to accommodate a plurality of remote controls. The optical wave guide receives remote control signals along one path and redirects or retransmits the signals along a second path in the direction of electronic equipment being controlled. The rotatable platform preferably provides 360 degrees of adjustment for orienting the output of the wave guide in the direction the equipment. In another embodiment, the remote control tower 10 may include a lamp fixture.

In an alternative embodiment, the remote control tower generally comprises a height adjustable stand, a bracket rotatably connected to the stand, a remote control holder unit and remote control clamp/clip. The bracket preferably rotates 360 degrees for horizontally adjusting the direction of the remote control. The remote control holder is rotataby mounted to the bracket by a rod or axle for adjusting the pitch or vertical direction of the remote control. The remote control holder can preferably hold a plurality of remote controls. The remote control clamp/clip attaches the remote control to the holder. The remote control clamp is preferably clamped to the remote control in a manner that allows the remote control and clamp to be removed from the holder when desired and conveniently placed back on the holder. The adjustable stand preferably comprises a plurality of segments telescopically joined together for adjusting and fixing the desired height of the stand. In another alternative embodiment, the adjustable stand may comprise a plurality of rods having the same or different lengths releasably joined together by corresponding male and female adapters. The adapters may be threaded or modular. The height is adjustment by selecting a particular rod or adding and removing rods. The rods are preferably wood but may comprise plastic.

The instant invention allows remote controls to be operated from the tower or removed for use. The tower provides a central location for storing remote controls. The remote control tower may be placed in any part of the home or office.

In accordance with these and other objects, which will become apparent hereinafter, the instant invention will now be described with particular reference to the accompanying drawings.

DETAILED DESCRIPTION OF THE INVENTION

Figure 1:
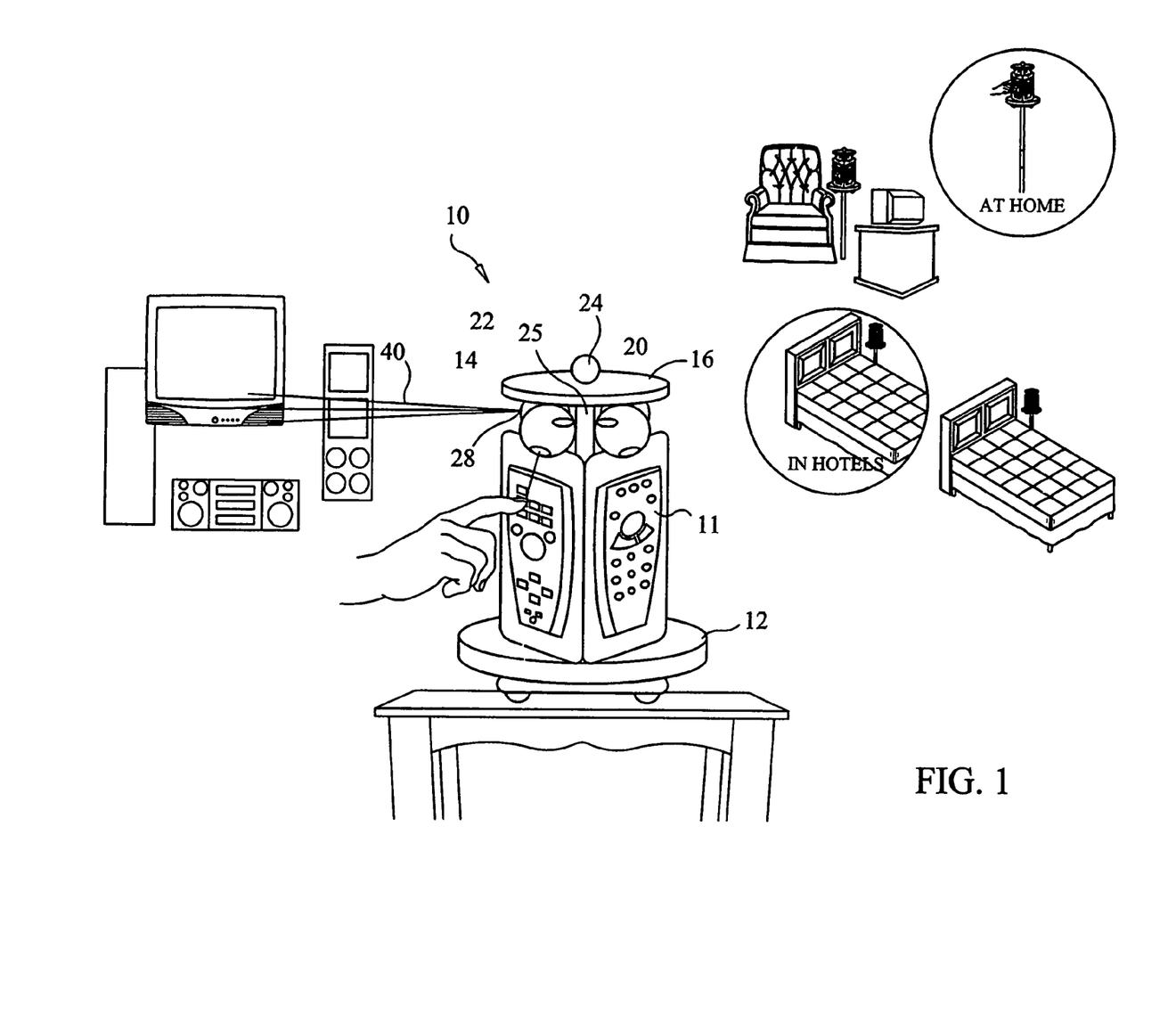
FIG. 1 is a perspective view of the preferred embodiment of the remote control tower of the instant invention.

With reference to the drawings, FIGS. 1 to 16 depict the preferred and alternative embodiments of the instant invention, which is generally referenced by numeric character 10 and/or as a remote control tower. Referring to FIG. 1, the preferred embodiment of the remote control tower 10 generally comprises an optical wave guide 14 and remote control support frame 16. The support frame 16 is preferably mounted on a rotatable platform 12 or adjustable height stand 34 or fixed into position on a table or similar piece of furniture. The invention 10 may also include one or more remote control units 11. The support frame 16 preferably supports a plurality of remote controls and is rotatable for selecting and directing the remote control, control signals and optical wave guides 14. The optical wave guide 14 receives and redirects or retransmits remote control signals, such as infrared. In one embodiment, the optical wave guide 14 may comprise mirrors, reflective material, or infrared radiation collectors and re-transmitters. An optical wave guide 14 receives a remote control signal along one path and redirects and retransmits it along a second path toward the electronic device being controlled. The optical wave guide 14 may be adjustably and rotatably connected to the support frame 16 to facilitate additional directional control.

The support frame 16 comprises a base 18 with feet 19, extension 20, endplate 22 and cap 24. The rotating platform 12 is rotatably mounted to the base 18. The extension 20 extends from the base 18 and/or rotating platform 12 to the endplate 22. The cap 24 and endplate 22 connect and/or mount to the end of the extension 20. The optical wave guide 14 preferably supported below the endplate 22 and optical communication with the remote control units 11.

Figure 2:
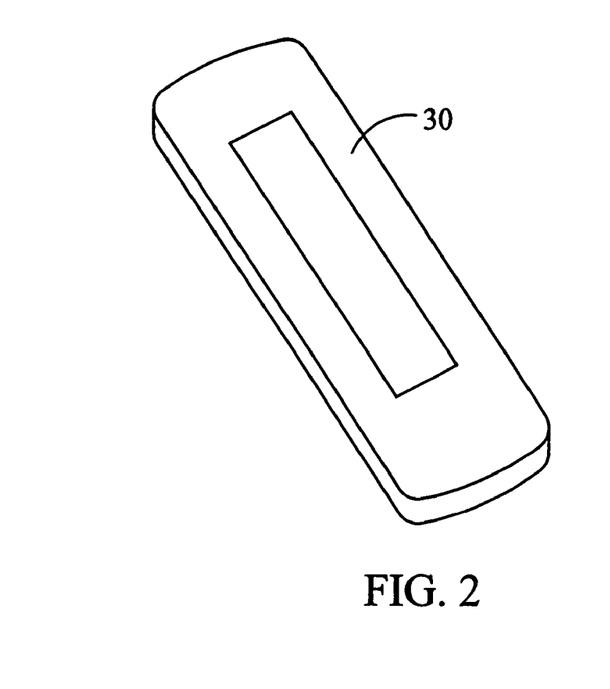
FIG. 2 is a perspective view of a remote control device incorporated with the instant invention illustrating a hook and loop fastener.

The remote control tower 10 preferably features an extension 20 comprising a vertical post 20 adapted for attaching one or more remote control units 11. The vertical post 20 is preferably essentially located on the rotating platform 12 or base 18. The vertical post 20 is fitted with structure for temporarily attaching one or more remote controls 11. For instance, the support frame 10 may include support plates for holding the remote control. With reference to FIG. 2, the remote control 11 may be attached to the plates using hook, and loop, such as that sold under the trademark Velcro. A first hook or loop strip 30 is attached or adhered to the backside of the remote control 11 and a second corresponding hook or loop strip 32 is affixed to the support plate. The remote controls 11 may also be attached using screws, adhesives or similar fasteners.

The remote controls 11 preferably comprise infrared photodiode transmitters. The remote controls 11 are secured to the support frame 16 such that they point into the optical wave guides 14. The optical wave guides 14 may comprise a series of mirrors or reflective material oriented for redirecting remote control signals in a desired direction. The wave guides 14 comprise a housing defining an optical cavity and at least one mirror or re-transmitter oriented and stored in the optical cavity. The wave guide 14 also includes or defines signal exit or transmission openings 28 that can be pointed in the direction of the equipment being controlled. The optical wave guide 14 may be provided with transmission openings 28 that point either left or right. In one embodiment, exit mirror or reflective surface directs the control signal out of the transmission opening 28. If a reflective material is used, it may form an optical waveguide that concentrates and redirects the incident beam. The reflective material for coating in the cavity of the wave guide 14 may comprise of any efficient reflector of infrared radiation, such as aluminum or nickel. Alternatively, the optical wave guide 14 may have doors or windows that open to reveal the exit opening 28.

The remote control tower 10 may be manufactured with alternative structure capable of securing remote control units without interfering with the optical wave guide 14. The remote control device 10 may be mounted on a rotatable platform 12 and adjustable stand 34 or fixed into position on a table or similar piece of furniture.

The vertical post 20 of the remote control tower 10 is preferably manufactured from aluminum or plastic employing one or more of the wave guides 14. The wave guides 14 housing may be made from molded plastic with mirror or reflective systems or re-transmitters enclosed therein. The wave guides 14 are preferably mounted to or proximal to the top of the post 20. The inside surface of the wave guides cavities may include mirrored surfaces or infrared reflective material comprising aluminum or nickel or a comparable reflective material.

Figure 3:
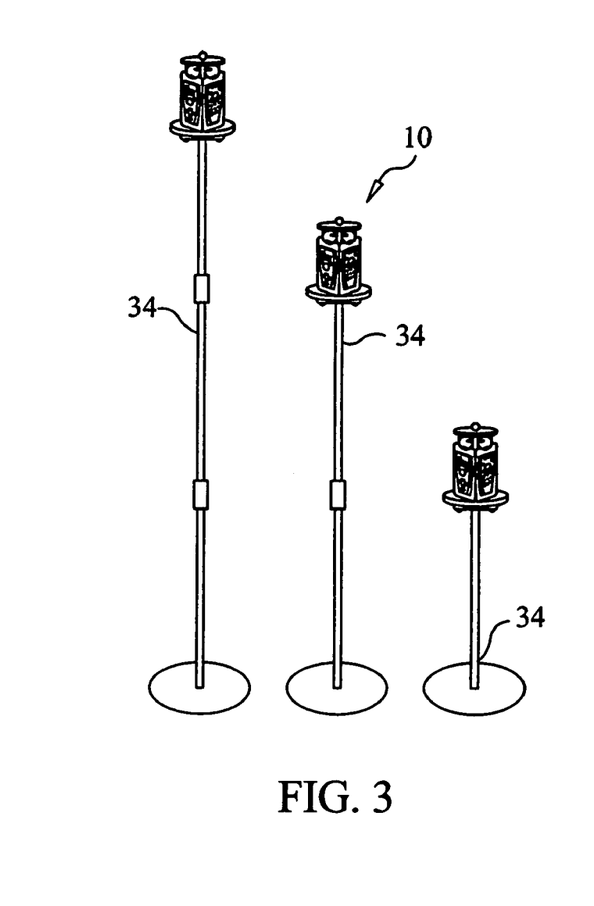
FIG. 3 is a perspective view of the preferred embodiment of the collapsible stand in accordance with the instant invention.
Figure 4:
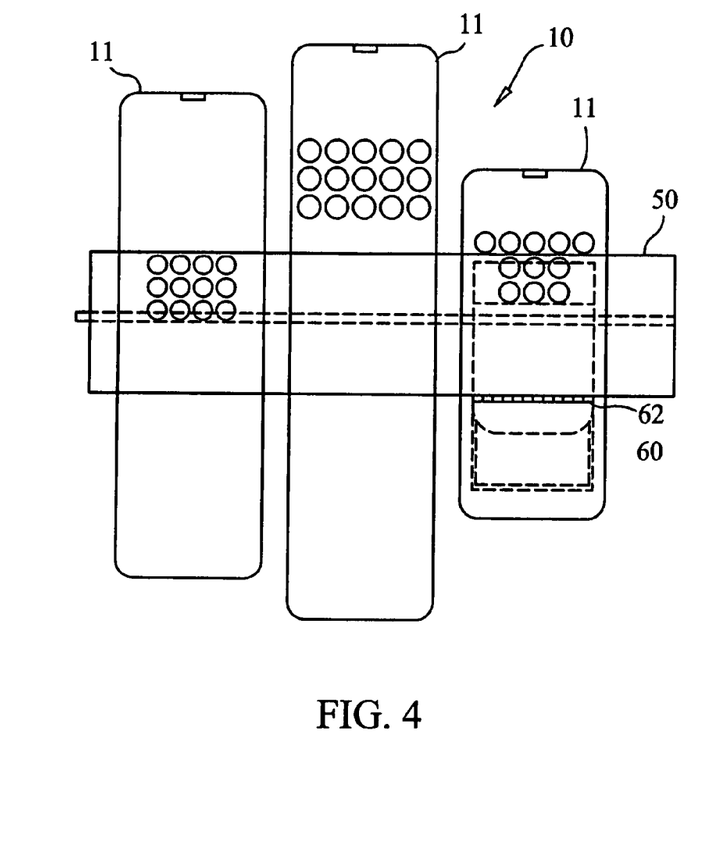
FIG. 4 is a plan view of common remote control units supported on an alternative embodiment of the remote control tower in accordance with the instant invention.
Figure 5:
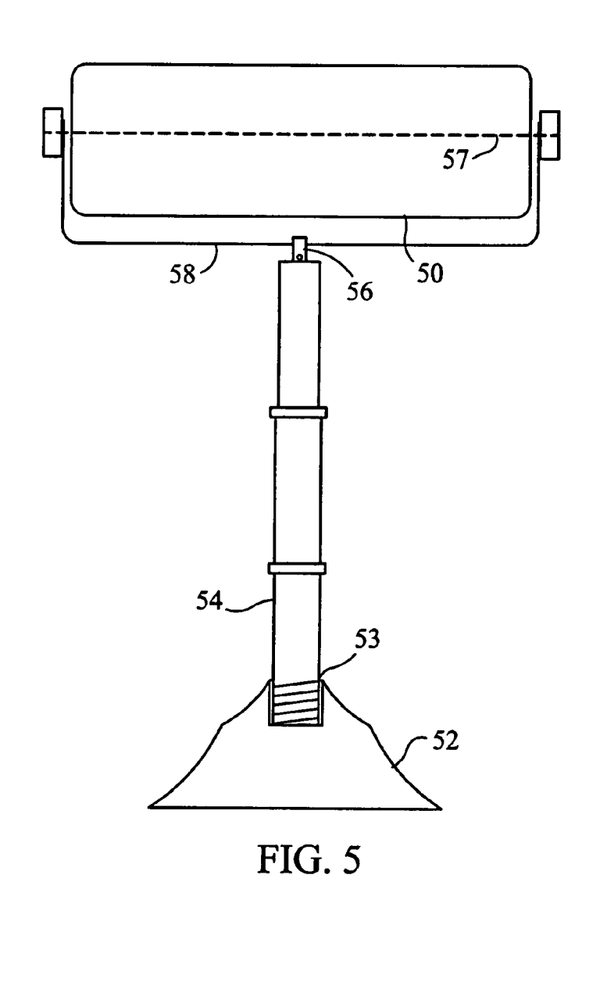
FIG. 5 is an elevational view of the alternative embodiment of the remote control tower in accordance with the instant invention.
Figure 6:
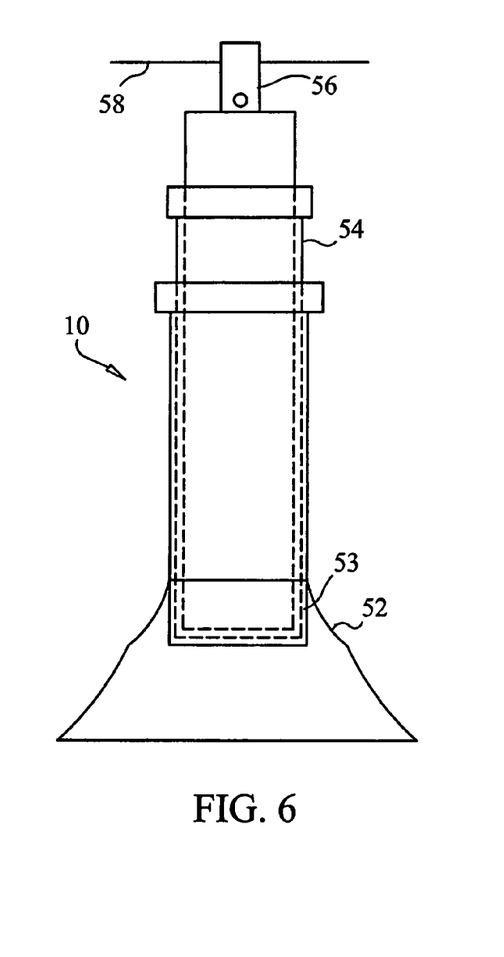
FIG. 6 is an elevational view of the alternative embodiment of the remote control tower stand in accordance with the instant invention.
Figure 7:
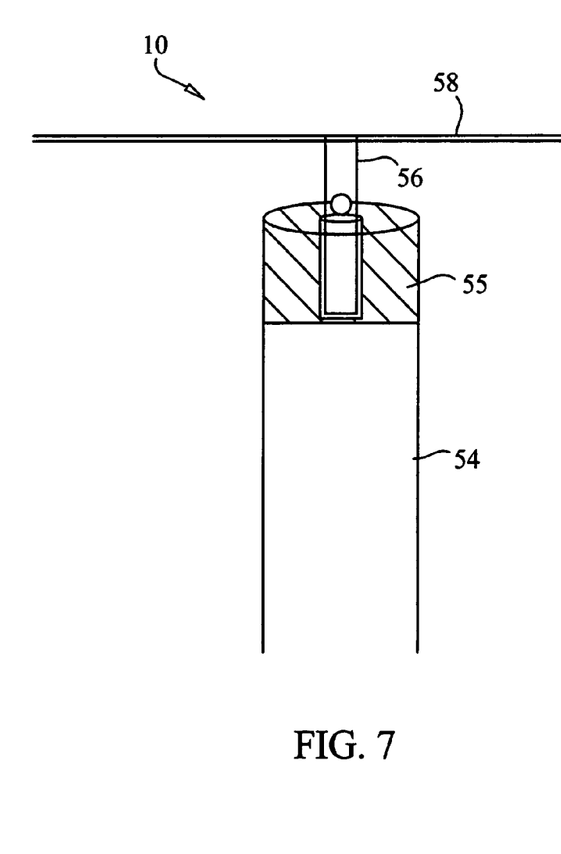
FIG. 7 is an elevational partial view of the alternative embodiment of the remote control tower illustrating the connection between the stand and bracket in accordance with the instant invention.
Figure 8:
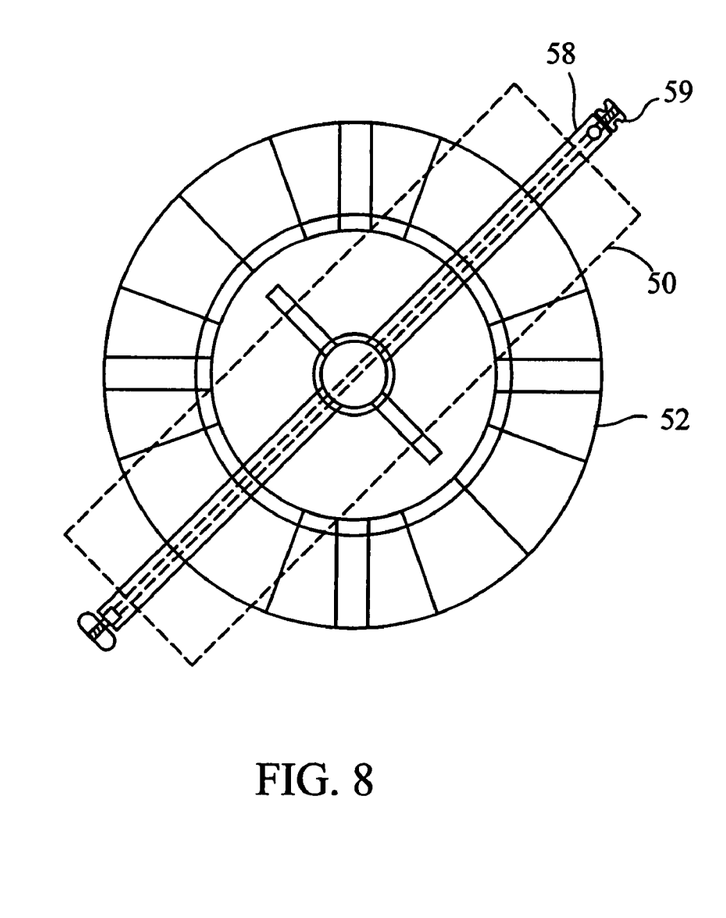
FIG. 8 is a plan view of the alternative embodiment of the remote control tower in accordance with the instant invention.
Figure 9:
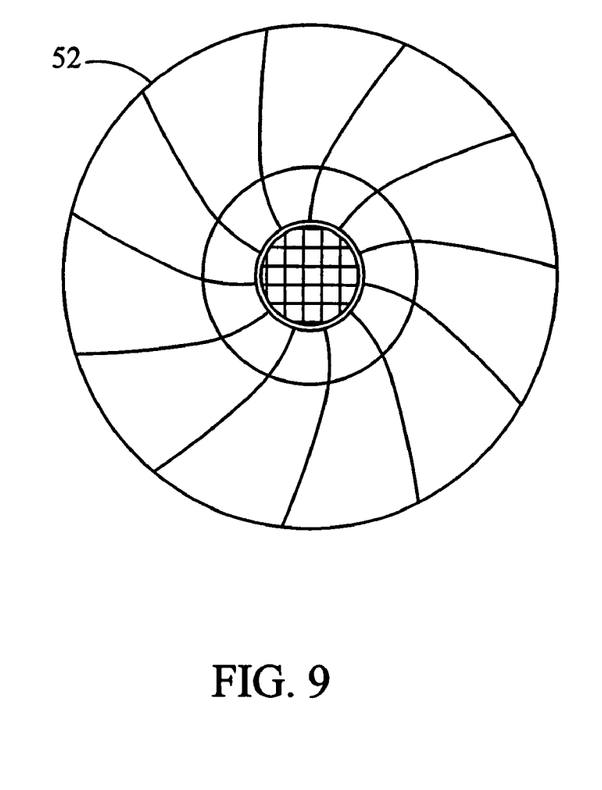
FIG. 9 is a plan view of the remote control tower threaded stand base of the alternative embodiment in accordance with the instant invention.
Figure 10A:
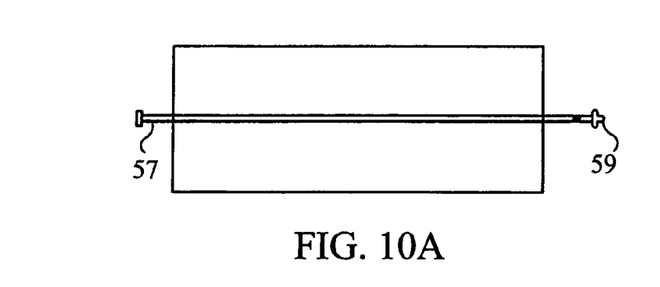
FIG. 10A is an elevational view of the remote control holder and axle of alternative embodiment of the remote control tower in accordance with the instant invention.
Figure 10B:
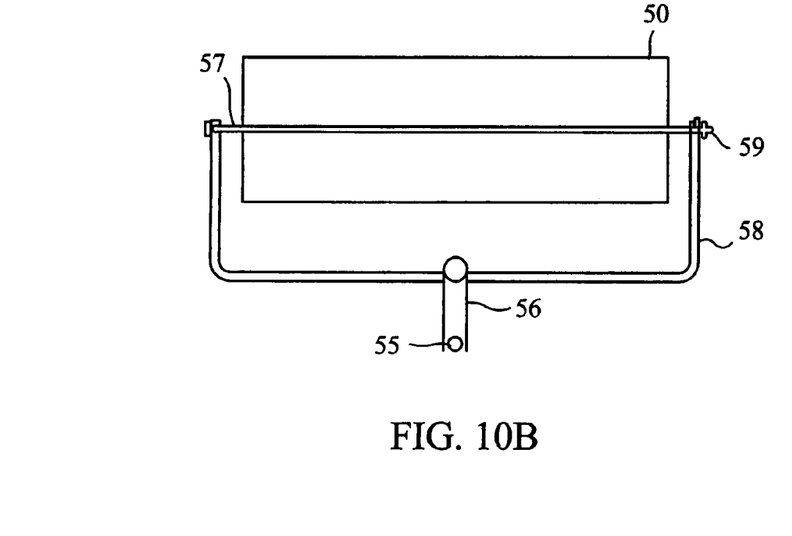
FIG. 10B is an elevational view of the remote control holder and axle of the alternative embodiment of the remote control tower in accordance with the instant invention.

With reference to FIG. 3, in another embodiment, the remote control tower 10 may comprise a portable multi-gear collapsible stand 34 which essentially adjusts to three different heights as shown in FIG. 3. A drink holder may also be incorporated into the remote control tower 10 of the instant invention. In addition, at least one lamp 25 may be incorporated into the design of the instant invention 10 to provide additional lighting for the room and/or to illuminate the controls. The lamp 25 preferably comprises a tubular design that is installed vertically in the center of the tower 10 by unscrewing the cap 24. The lamp 25, may also be incorporated into the cap 24 or secured to the support frame and/or below the end plate 22.

To use the preferred embodiment of the instant invention, the remote control tower 10 is placed adjacent to the user within arm's reach. The remote control tower 10 may include the remote control unit 11 or be adapted for attaching currently existing remote control units by using any of the fasteners disclosed herein. The remote control devices 11 are attached so that they are point into the wave guides 14, such as by being oriented upwardly and vertically with reference to the support post 20 using the appropriate fastener. The remote control tower 10 includes support plates for attaching and supporting the remote controls. The remote control tower 10 is oriented such that the signal transmission opening 28 points in the direction of the electronic equipment to be controlled. It is also important to ensure that the remote control unit's infrared photodiode transmitters point into the optical wave guide 14. The remote control tower 10 may include an attachment means that aligns the remote control unit's infrared transmitters in the proper direction. The remote control units 11 are then operated by using a single hand and without having to hold and manually direct the remote control or controls. The tower 10 is rotated to select a desired remote control and orient it in the property direction toward the equipment to be controlled. If the signal is not properly reaching the desired equipment, the optical wave guides 14 may be rotated to find the optimal position. A cable, wire or chain may be used to assist the attachment to remote control tower 10 in a manner that secures it from theft.

Figure 15:
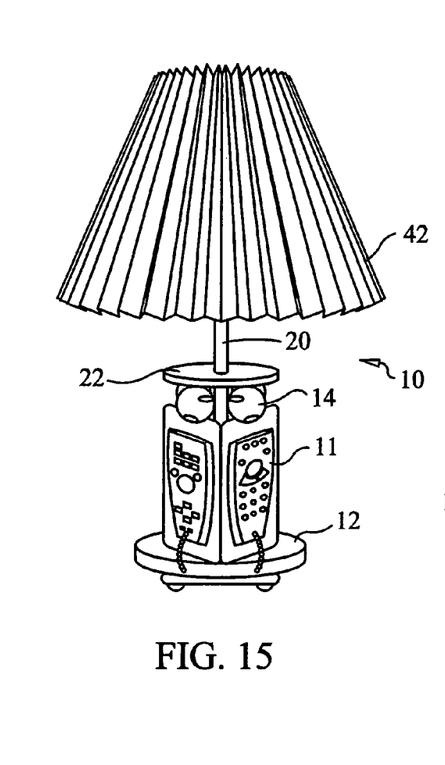
FIG. 15 is a perspective view of another alternative embodiment of the remote control tower incorporating a lamp in accordance with the instant invention.
Figure 16:
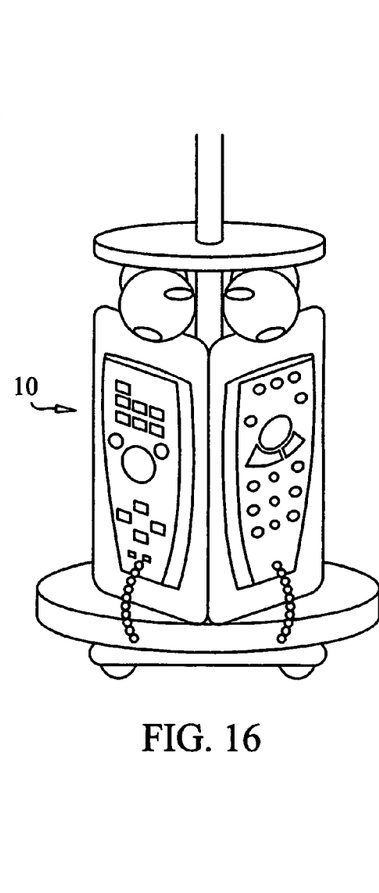
FIG. 16 is a perspective view of another alternative embodiment of the remote control tower incorporating a lamp in accordance with the instant invention.

With reference to FIGS. 15 and 16, an alternative embodiment of the remote control tower 10 comprises a lamp structure 42. The lamp structure 42 utilizes the extension 20 as a conduit for running wires to an electrical lamp socket. The lamp structure 42 further comprises a frame for supporting a lamp shade.

With reference to FIGS. 4–14, another alternative embodiment of the remote control tower 10 generally comprises a height adjustable stand 54, a base plate 52 with a treaded slot 53 for threadably receiving and supporting the stand 54, a bracket 58 rotatably connected to the stand 54, a remote control holder unit 50 and remote control clamp/clip 70. The bracket 58 is rotatably mounted to the stand 54 by a pin 56, which sits in and mechanically cooperates with a plastic insert 55 so that the bracket 58 can rotate 360 degrees for horizontally adjusting the direction of the remote control. The remote control holder 50 is rotataby mounted to the bracket 58 by a rod or axle 57 for adjusting the pitch or vertical direction of the remote control when rotating the holder 50 up and down. Wing nuts 59 secure the axle 57 to the bracket 58 and can provide a handle for adjusting and securing the height of the holder 50. The remote control holder 50 can hold a plurality of remote controls 11 and preferably supports four remote controls 11. A remote control 11 is secured to the holder 50 by the remote control clamp/clip 70.

Figure 11:
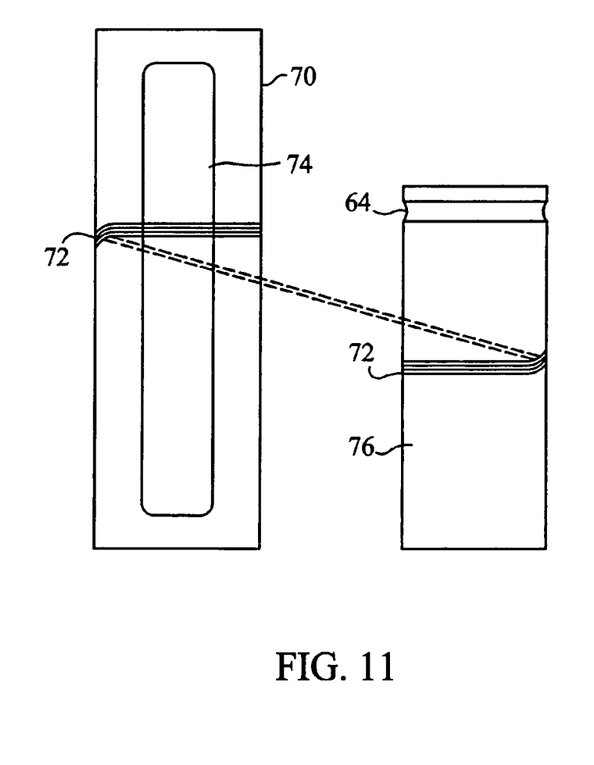
FIG. 11 is a plan and bottom view of the remote control clamp of the alternative embodiment of the remote control tower in accordance with the instant invention.
Figure 12:
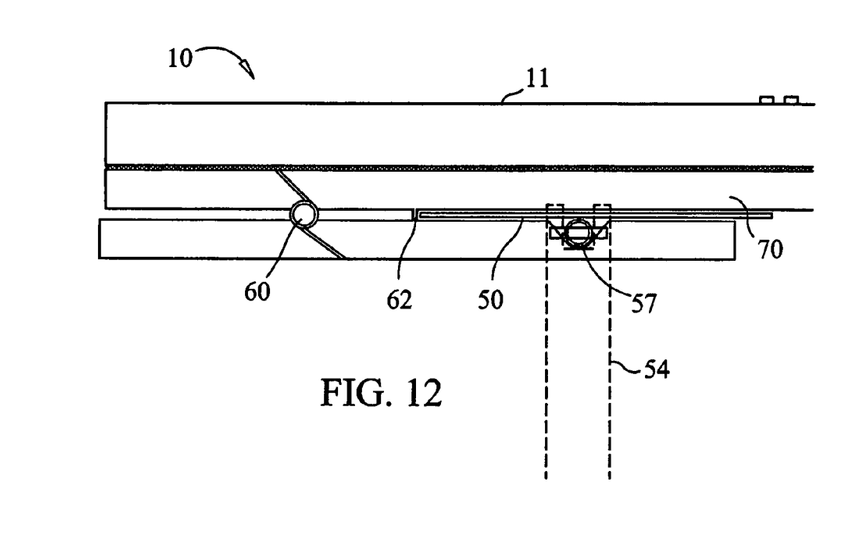
FIG. 12 is a side elevational view of the remote control holder and clamp of the alternative embodiment of the remote control tower in accordance with the instant invention.
Figure 13:
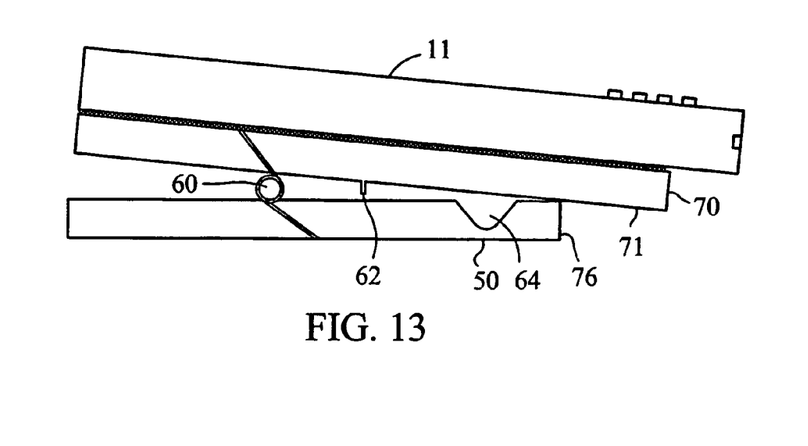
FIG. 13 is a side elevational view of the remote control holder and clamp of the alternative embodiment of the remote control tower in accordance with the instant invention.

The remote control clamp/clip 70 attaches the remote control 11 to the holder 50. The clamp 70 includes a spring wire 72, fastener such as a hook-and-loop strip 74, top section 71 and bottom section 76 with a groove 64 for receiving and holding a threaded rod on the remote control holder 50. The invention 10 includes a spring 60 joining the clip top section 71 and bottom section 76. The top section 71 also includes a spacer tab 62 for controlling the distance between the top 71 and bottom 76. The remote control clamp 70 is preferably clamped to the remote control in a manner that allows the remote control and clamp to be removed from the holder when desired and conveniently placed back on the holder. The clamp/clip 70 is designed so that once the remote 11 is attached to the clip 70, such as by hook-and-loop, the clip 70 and remote control 11 can be easily removed from the holder 50 and placed back on the holder 50 without having to separate the remote control 11 and clamp/clip 70.

Figure 14:
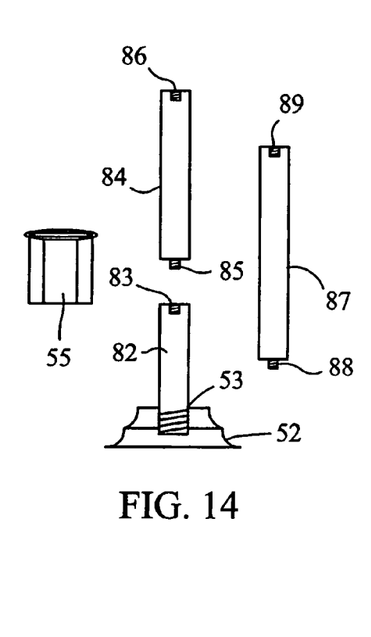
FIG. 14 is an exploded view of another alternative embodiment of the remote control tower stand in accordance with the instant invention.

The tower 10 is designed so that it can be adjusted to the desired height. Accordingly, the adjustable stand 54 preferably comprises a plurality of segments telescopically joined together for adjusting and fixing the desired height of the stand 54. By having a collapsible styled tower stand 54, the remote control tower 10 can be placed on a table or the floor to provide an accessible height and easy access to the tower 10. The lower section of the stand 54 is screwed into the threaded port 53 in the base 52. With reference to FIG. 14, the adjustable stand may comprise a plurality of rods 82, 84 and 87 having the same or different lengths releasably joined together by corresponding male and female adapters 83, 85 86 88, 89 in another alternative embodiment. The adapters 83, 85 86 88, 89 may be threaded or modular and may include a plastic sleeve insert 55. The height is adjustment by selecting a particular rod 82, 84, 87 or adding and removing rods. The rods 82, 84, 87 are preferably wood but may comprise plastic.

The instant invention has been shown and described herein in what is considered to be the most practical and preferred embodiment. It is recognized, however, that departures may be made therefrom within the scope of the invention and that obvious structural and/or functional modifications will occur to a person skilled in the art.

What is claimed is:

1. A remote control stand for releasably holding at least one remote control and facilitating directional control of signal transmissions from the remote control, said stand comprising:
    a base;
    a rigid rod extending from said base, said rod defining a vertical axis;
    supporting means, rotatably mounted to said rod, for supporting at least one remote control;
    mounting means for releasably mounting at least one remote control to said support means; and
    directing means, in mechanical communication with said supporting means, for directing signal transmissions from the remote control toward electronic equipment to be controlled while the remote control is mounted to said supporting means.

2. A stand as recited in claim 1, wherein said directing means is rotatable around a fixed horizontal axis and around a fixed vertical axis.

3. A stand as recited in claim 1, wherein said rigid rod is height adjustable.

4. A stand as recited in claim 1, wherein said means for directing signal transmissions is adjustable.

5. A stand as recited in claim 1, wherein said means for directing signal transmissions comprises:
    a least one optical wave guide, mounted to said rigid rod, having an optical input, optical output and at least one light reflective surface between said input and output.

6. A stand as recited in claim 1, further comprising:
    a lamp socket for mechanically and electrically supporting a light bulb; and
    means for providing electrical power to said lamp socket.

7. A stand as recited in claim 1, further comprising:
    said supporting means comprises a top plate rotably secured to said directing means;
    said directing means comprising a bracket rotatably mounted to said rigid rod in a manner that facilitates rotation around a vertical axis at least partially defined by said rigid rod and a substantially horizontal axle rotatably mounting said top plate to said bracket for facilitating rotation of said top plate around said horizontal axle for pitch adjustment.

8. A stand as recited in claim 1, wherein said means for releasably mounting at least one remote control comprises:
    a hook-and-loop fastener.

9. A stand as recited in claim 1, wherein said means for directing comprises:
    a remote control holding plate rotatably mounted to said supporting means, said plate being rotatable around a vertical axis and a horizontal axis.

10. A remote control stand for releasably holding at least one remote control, said stand comprising:
    a base;
    a rigid, vertically adjustable pole secured to said base;
    a bracket rotatably mounted to said pole in a manner for facilitating rotation around a substantially vertical axis at least partially defined by said pole;
    a remote control holder rotatably mounted to said bracket by a substantially horizontally positioned axle for adjusting the pitch of said remote control holder; and
    means for mounting at least one remote control to said holder.

11. A stand as recited in claim 10, wherein said adjustable pole is telescopic for adjusting the height of said pole.

12. A stand as recited in claim 10, wherein said adjustable pole comprises a plurality of releasably connecting rods.

13. A stand as recited in claim 10, wherein said mounting means comprises at least one clamp.

14. A stand as recited in claim 10, wherein said mounting means comprises hook-and-loop.

* * * * *